A. BENGTSON.
ADJUSTABLE BRACE.
APPLICATION FILED OCT. 10, 1919.
1,426,247.
Patented Aug. 15, 1922.
2 SHEETS—SHEET 2.
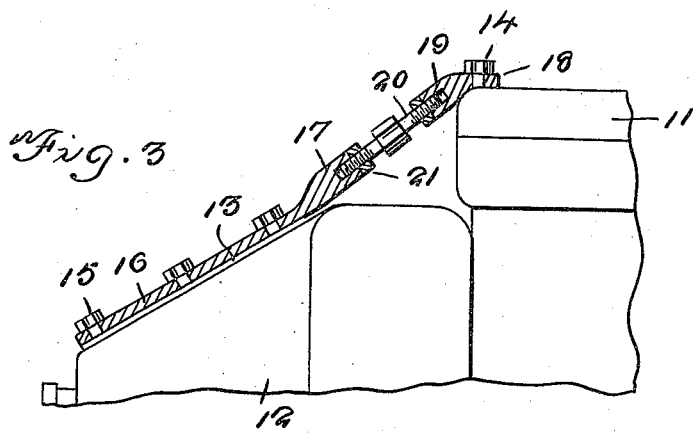
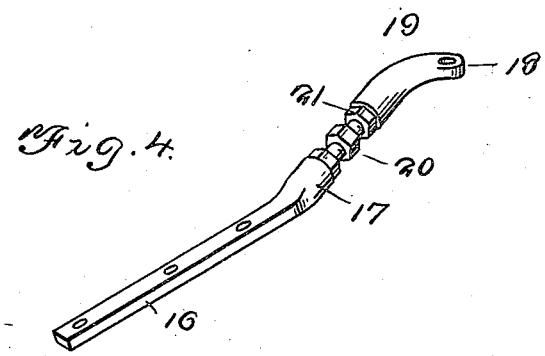
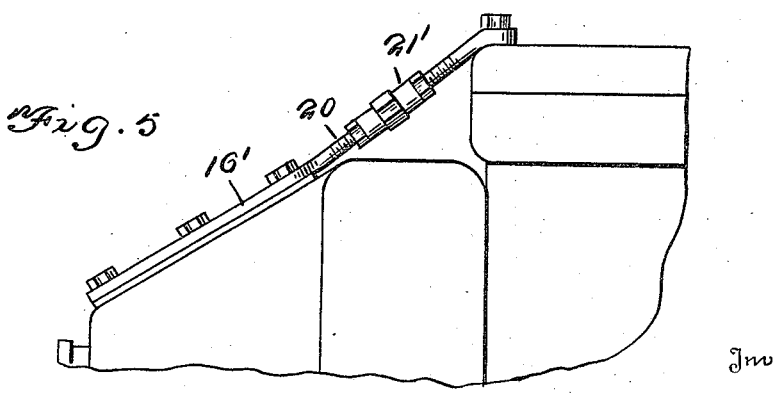
Inventor
Albin Bengtson
By Victor J. Evans
Attorney
Witnesses
E. R. Ruppert

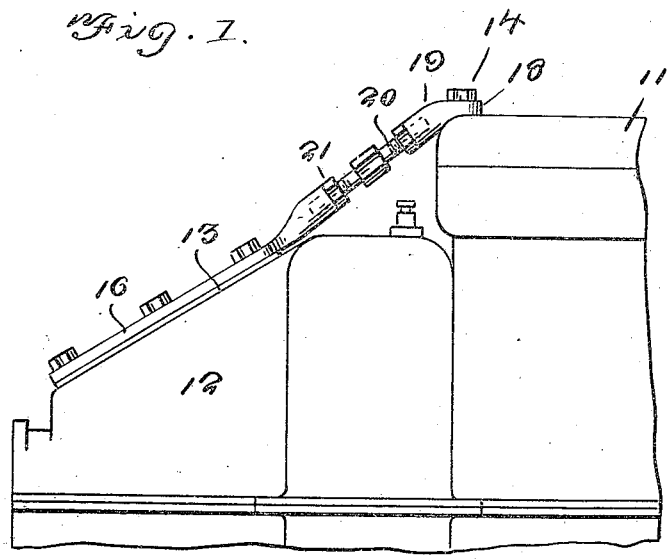
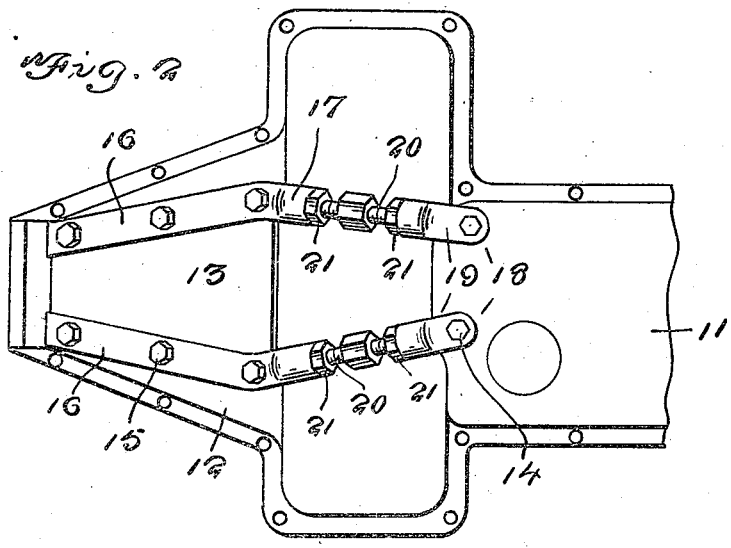

UNITED STATES PATENT OFFICE.

ALBIN BENGTSON, OF LUCK, WISCONSIN.

ADJUSTABLE BRACE.

1,426,247.   Specification of Letters Patent.   Patented Aug. 15, 1922.

Application filed October 10, 1919. Serial No. 329,779.

*To all whom it may concern:*

Be it known that I, ALBIN BENGTSON, a citizen of the United States, residing at Luck, in the county of Polk and State of Wisconsin, have invented new and useful Improvements in Adjustable Braces, of which the following is a specification.

From experience I have found that with automobiles, especially that of the Ford make, frequent accidents occur because the transmission end bearing works out of alinement with the other bearings, causing it to spring and finally break which, of course, results in the breakage of the crank shaft.

In addition to this the motor casing and transmission casing are joined together only at the lower portion of the upper members thereof, and incident to continuous vibration a breakage between these parts not unfrequently occurs which, of course, occasions serious damage to the machine.

It is the object of the present invention to reinforce and brace the transmission casing and motor casing in a simple manner whereby such contingencies will be effectively overcome.

It is a further object of the invention to produce a brace for this purpose which may be applied to any ordinary construction of Ford or such like motors.

It is a still further object of the invention to provide a brace of this character which shall be adjustable so that all wear thereon may be compensated for.

Other objects and advantages will present themselves as the nature of the invention is better understood, reference being had to the accompanying drawings, in which:

Figure 1 is a side elevation illustrating the application of the improvement.

Figure 2 is a top plan view thereof.

Figure 3 is a side elevation, similar to Figure 1, but showing the improvement in section.

Figure 4 is a perspective view of the improvement.

Figure 5 is a side elevation illustrating a slight modification.

In the drawings a motor casing for the Ford make of automobiles is indicated by the numeral 11 and the transmission casing, which has its forward end connected at its lower portion with the rear end of the motor casing, by the numeral 12. The plate covering the top opening in the transmission casing is indicated by the numeral 13.

The bolts which hold the head of the motor casing are indicated by the numerals 14, and the bolts that hold the plate 13 on the transmission casing are indicated by the numeral 15.

My improvement contemplates two plates 16 having openings therein designed to aline with the openings through which the bolts 15 pass so that the plates 16 are thus connected to the plate 13 and to the transmission casing 12. The plates 16 are really in the nature of straps and will hereinafter be so referred to. These straps at their outer ends or at their ends nearest the motor casing 11 are upset and provided with threaded sockets 17.

Secured to the top of the motor 11 by the end bolts 14 are what I will term the straight portions 18 of angle sockets 19. These sockets 19 are arranged in a line with the sockets 17 and are provided with internal threads which are pitched opposite the threads in the sockets 17. Received in the respective sockets 17 and 19 are the oppositely pitched threads of bolt members 20, and on one of the threaded portions of each of the bolts is a locking nut 21 that is designed to contact with the socket 19 whereby to hold the sockets effectively adjusted with respect to each other.

In Figure 5 of the drawings I have shown the plates 16' provided, at their confronting ends with alining bolt members 20'. The oppositely disposed bolt members have their threads pitched at different angles and terminate a suitable distance away from each other. These bolt members are connected by a turn buckle 21' which is designed to be secured, when properly adjusted in any desired or preferred manner.

From the foregoing description, when taken in connection with the drawings, it will be seen that I have not only provided a simple means for reinforcing the motor and transmission casings of automobiles so as to effectively prevent the breakage therebetween, but have also provided a device which will insure the disconnection of such parts should a slight fall or crack occur therein.

Having thus described the invention, what is claimed as new, is:—

In combination with the motor and transmission casings of an automobile, said motor casing having its head secured thereto by bolts, the transmission casing having the usual opening provided with a closure plate that is bolted thereto, of reinforcing means between the casings, comprising straps secured to the plate by the bolts that hold the plate on the transmission casing, each of said straps having its outer end enlarged and formed with an interiorly threaded socket, an angle socket member secured by the end bolts to the motor casing and disposed in a line with the first mentioned sockets having interior threads of an opposite pitch from those of the first mentioned sockets, bolts having oppositely pitched ends received on the sockets, and lock nuts on the bolts contacting with the sockets.

In testimony whereof I affix my signature.

ALBIN BENGTSON.